United States Patent [19]
Anglin, Jr. et al.

[11] Patent Number: 5,892,591
[45] Date of Patent: Apr. 6, 1999

[54] FACSIMILE TRANSMISSION VIA PACKET SWITCHED DATA NETWORKS

[75] Inventors: Richard L. Anglin, Jr., Del Mar; Edward A. Kent, Irvine, both of Calif.

[73] Assignee: International Data Forwarders, LLC, San Diego, Calif.

[21] Appl. No.: 755,269

[22] Filed: Nov. 22, 1996

[51] Int. Cl.[6] .................................... H04N 1/32
[52] U.S. Cl. .................. 358/407; 358/434; 358/442; 358/468
[58] Field of Search ................... 358/400, 434–436, 358/438–440, 442, 468, 402, 403, 407; 370/352, 360; H04N 1/32

[56] References Cited

U.S. PATENT DOCUMENTS

| | | |
|---|---|---|
| Re. 31,182 | 3/1983 | Crager et al. . |
| 4,058,838 | 11/1977 | Crager et al. . |
| 4,941,170 | 7/1990 | Herbst ..................................... 358/440 |
| 5,296,934 | 3/1994 | Ohtsuki ................................... 358/400 |
| 5,546,388 | 8/1996 | Lin . |
| 5,671,067 | 9/1997 | Negishi et al. ......................... 358/403 |

FOREIGN PATENT DOCUMENTS

| | | |
|---|---|---|
| 2240691 | 8/1991 | United Kingdom . |
| WO 95/26097 | 9/1995 | WIPO . |
| WO 96/10312 | 4/1996 | WIPO . |

*Primary Examiner*—Kim Yen Vu
*Attorney, Agent, or Firm*—Anglin & Giaccherini

[57] ABSTRACT

Methods and apparatus for transmitting documents using the Internet are disclosed. In accordance with a preferred embodiment of the invention, a document (3200) which is to be transmitted to a recipient is fed into a local facsimile machine (3100). The document (3200) includes a cover sheet (3210) containing a destination facsimile number (5100) and number of sheets which contain the message to be transmitted to the destination. The sender then dials the local telephone number of a remote computer system (2000). The document (3200) is then transmitted to the remote computer (2000) via a modem (2400) over a local telephone line (7000). The remote computer (2000) then scans the cover sheet (3210) and extracts the destination facsimile number (5100). The document (3200) is then formatted for transmission via public switched data network, specifically Internet backbone network(s) (6000), and is routed from the remote computer system (2000) to a host network computer system (4000). The document is then routed via the Internet (6000) to a remote computer system (4100) near the destination facsimile, and ultimately is delivered to its destination (5100).

6 Claims, 4 Drawing Sheets

FACSIMILE TRANSMISSION VIA PACKET SWITCHED DATA NETWORKS

FIELD OF THE INVENTION

The present invention relates to the field of facsimile transmissions. More particularly, this invention provides novel methods and apparatus for enabling users of traditional facsimile machines to utilize high speed packet switched data communications networks for the transmission of facsimile communications. Utilization of the present invention can increase the speed of facsimile transmission, as well as lower the overall cost of transmissions.

BACKGROUND OF THE INVENTION

The pace of business, whether domestic or international, is accelerating. At the same time the geography of business has become increasingly global and its morphology more complex and intertwined. Time and information are the most precious commodities of business today. Hence, the tremendous increase in the use of facsimile transmissions, in many cases supplanting postal services.

Pitney Bowes Corporation Facsimile Systems Division commissioned The Gallup Organization for three consecutive years (1992–1994) to conduct market research to determine a measurement of facsimile usage and applications of daily facsimile users at Fortune 500 Corporations and Dun & Bradstreet mid-sized companies in the United States. The Gallup Organization randomly sampled four hundred (400) daily facsimile users at Fortune 500 companies during the first quarter of each of the four going three years. In 1993 Dun & Bradstreet mid-sized companies (100–500 employees) were added to the study.

In 1994 the majority of facsimile users at both Fortune 500 and mid-sized companies stated that their facsimile utilization had increased over the past year and that it would increase in the coming years. The average daily outgoing facsimile volume for a typical facsimile user at a Fortune 500 company averaged 41.4 documents per day from 1992 to 1994, averaging 4.7 pages per facsimile transmission. Thus, a typical user at a Fortune 500 company averaged approximately two hundred (200) pages of facsimile transmission per day during this period. During the same period atypical user at a mid-sized company sent an average of 33.8 documents per day via facsimile averaging 3.5 pages per document. The utilization of facsimile transmissions by typical users at mid-sized companies was approximately one hundred twenty (120) pages per day.

Eleven percent (11%) of Fortune 500 and seven percent (7%) of mid-sized company facsimiles were sent to international destinations outside the United States during the period of the survey. The top five countries were the United Kingdom, Germany, Japan, Canada and Mexico. It is interesting to note that no Asian countries were listed other than Japan. The same survey taken today would undoubtedly show higher facsimile transmission rates to Asia.

Only five percent (5%) of 1994 Fortune 500 and two percent (2%) of mid-sized company users reported sending facsimile transmissions during the evening or night when dialing rates are cheaper.

In the first quarter of 1994 The Gallup Organization undertook a survey Fortune 500 telecommunication managers focused on facsimile costs and management policies. Fortune 500 telecommunications managers reported that thirty-six percent (36%) of their total telephone charges were related to facsimile transmissions, twenty point one percent (20.1%) for long distance and five percent (5%) for international. International long-distance is expected to grow at a compound annual growth rate of over fourteen percent (14%) over the next two to three years. Half of the Fortune 500 companies expected their facsimile charges to increase in the coming years by an average of twelve percent (12%). These managers ranked facsimile as one of the most productive telecommunication systems within their company, second only to voice mail.

Fortune 500 companies spend on average $2.9 million per corporate location for annual telephone services. On this basis approximately one million dollars is spent annually per location for facsimile services of which approximately $600,000 is for long distance facsimile transmission and $150,000 is for international facsimile transmission.

Interestingly, even with the availability of electronic mail ("E-mail" or "e-mail") services and the ability to send facsimile transmissions directly from a personal computer ("PC") with a modem, facsimile transmissions continue to increase and are expected to do so for the coming years. Further, facsimile usage is just as high for companies that use e-mail as for those that do not.

To send a facsimile a person walks to the facsimile machine, inserts the document to be transmitted, dials the destination telephone number and activates the facsimile machine. The sending machine dials the receiving facsimile machine number and when it answers sends the document to the receiving machine. Traditional facsimile transmissions are sent over the Public Switched Telephone Network ("PSTN") just like a voice telephone call. Facsimile machines contain modems (MODulator/DEModulator) which transmit and receive data transmissions over a voice telephone circuit.

The user pays the local and long-distance telephone company charges prevailing at the time he or she sends the facsimile transmission. This can be particularly expensive for international facsimile transmissions.

Advanced-featured facsimile machines, more expensive than basic machines, enable the user to store documents for transmission at a later time. This capability is constrained by the amount of memory in the facsimile machine in which to store documents and requires programming by the user. As is described above, deferred or delayed transmission is not widely utilized. For international transmissions the delay process is further complicated by the need to know or look-up the time periods in which cheaper international dialing rates apply.

The most common modem speed in facsimile machines has been 9600 bits per second ("bps") for quite a long period of time. In many parts of the world, however, facsimile machines are still in use that transmit data at 4800 bps and slower speeds. Newer and more expensive facsimile machines today contain modems capable of operating at speeds up to 14,400 bps (14.4 kbps). However, the ability to use the higher speeds is dependent upon the quality of the telephone line connection between the originating and destination facsimile machines. The slower the speed of the modem, the longer it takes to send a facsimile transmission. In the United States today one page of text takes less than a minute to send; in some parts of the world the same page of text can take up to three minutes to send. The cost implications are obvious.

What is today commonly referred to as the Internet began as a Defense Advanced Research Projects Agency ("DARPA") project in 1969 (at that time "ARPA") entitled Resource Sharing Computer Networks. The object of this project was to develop a robust network across the country that would keep military sites in communication in the event of a nuclear war. Since this project was funded by ARPA, it was generally referred to as ARPANET. The ARPANET, which operated until 1990, consisted entirely of 56 kbps lines linking sixteen cities across the United States. Its use was restricted to the United States Department of Defense ("DOD") and its contractors.

ARPANET was in every sense experimental. From 1969 to 1983 a lot of different packet switching schemes were tried. The term "Internet" was probably first applied to a 1973 research program that culminated in a demonstration system in 1977. It demonstrated networking through various media, including satellite, radio, telephone, ethernet and the like using packet switching. The Transmission Control Protocol and Internet Protocol ("TCP/IP"), a packet switching protocol, is what grew out of ARPANET's experiments.

In 1984 the National Science Foundation ("NSF") established an office for networking with the objective of tying together universities and other research establishments. Their first efforts at a national backbone NSF Network ("NFSNet") was deployed in 1986 as a 56 kbps network. In 1987, NSF contracted with Merit, a non-profit corporation comprised of some eleven Michigan Universities, to build a national backbone network using T-1 1.544 Mbps links to sixteen cities. IBM and MCI joined together to form a subsidiary company entitled Advanced Network Services, Inc. ("ANS") and Merit awarded a subcontract to them to actually build a T-1 network. In the interim, a number of universities and research groups got access to ARPANET. In a very real sense the NFSNet was more of an evolution of ARPANET than an entirely new network.

There was enormous controversy over the switching technology to increase the NSFNet backbone to T-3 speeds of 45 Mbps as late as 1993. In fact, for several years, the packet switches that ANS used did not really switch data packets fast enough to actually achieve 45 Mbps links. But by late 1993, the T-3 network was more or less working. On Apr. 30, 1995, operation of the NSFNet backbone ceased.

Backbone bandwidth refers to the carrying capacity of the top level links connecting various metropolitan areas around the world. Today the Internet consists of as many as eighteen national backbone networks operated by private companies, all interconnected in a few cities. These interconnections take place in several Network Access Points ("NAP's"). The backbones are almost all T-3 links operating at 45 Mbps. Furthermore, these backbones have been extended internationally.

In March 1996, MCI announced that it had increased the speed of its entire backbone to 155 Mbps. Other Internet Service Providers ("ISP's") have made similar announcements.

The problem of providing an easy, reliable and low-cost method for automatically routing and transporting facsimile traffic at high speeds has presented a major challenge to persons skilled in the telecommunications field. The development of methods and apparatus that would overcome this problem would constitute a major technological advance and would satisfy a long felt need within the telephony and electronics industries.

SUMMARY OF THE INVENTION

The present invention enables users of traditional facsimile machines to utilize high speed packet switched data communications networks for the transmission of facsimile communications. By automatically routing and transporting facsimile transmissions over a high-speed packet switched data network instead of using the conventional public switched telephone network, the speed of facsimile transmission can be increased and the overall cost of the transmission can be reduced. As the transmission distance is increased, the speed advantage of the present invention becomes ever more pronounced. The inventions described and claimed below are especially attractive for international facsimile transmissions.

One preferred embodiment of the present invention encompasses a network comprising a plurality of remote computers located throughout the world which communicate with a plurality of network host computer systems located at one or more Network Management Centers ("NMC's"). In addition to other functions, the remote computers provide an interface between analog dial-up telephone lines serving traditional facsimile machines, and a packet switched data network ("PSDN"), specifically the world-wide Internet backbone.

A remote network computer may be as simple as a personal computer ("PC") with a hard-drive for storing received facsimile transmissions, a modem for interconnecting with the local telephone network, and a router or other device for interconnecting with the Internet backbone. It may utilize any one or more of an operating system ("OS"). In the preferred embodiment the invention, the remote network computers run Microsoft Windows NT® Workstation 4.0 or Microsoft Windows 95® as their operating systems.

The host network computer system can likewise be as simple as a PC with a router or other device to interconnect with the Internet backbone. In the preferred embodiment, the host computer system is a local area network ("LAN") with distributed elements for fail-over and fail-safe mission critical operation. The object is to ensure network robustness and full-time availability. It may utilize any one or more OS's. In a preferred embodiment, the OS of the host network computer system is Microsoft Windows NT Server 4.0.

In accordance with the present invention, the user of the system (the "sender") feeds the document (the "message") which is to be transmitted to a recipient into his or her facsimile machine. The sender's document includes (1) a cover sheet containing information about the user and the destination facsimile number and (2) a number of sheets which contain the message to be transmitted to the destination. The sender then dials the local telephone number of a remote computer system.

When the modem in the local facsimile machine connects to the modem in the remote computer system via a local telephone line, the document is transmitted to the remote computer. Software within the remote computer then scans the cover sheet. An algorithm embedded in the software identifies the location on the cover sheet where the destination facsimile telephone number is printed, whether it is typewritten or handwritten. The cover sheet may include fixed fields to aid in ascertaining the required information, or software based on artificial intelligence ("AI") algorithms may be used to search a free form cover sheet to identify the fields having the required characteristics, that is, the destination facsimile number. Once the required field is located on the cover sheet, optical character recognition ("OCR") software scans the area containing the destination facsimile telephone number. This number is stored at a specific location within the remote computer file which comprises the document in digital form. One preferred embodiment of the present invention uses RightFAX™ software from RightFAX™, Inc. to accomplish these tasks.

The cover sheet may also contain other data about the user, including, for example, the sender's name, voice telephone number, originating facsimile number, account number, number of pages comprising the document, the recipient's name and the recipient's voice telephone number. This data is appended to the remote computer file which will be used to transmit a message to the recipient. In one preferred embodiment of the present invention RightFAX™ is likewise used to accomplish these tasks.

The document in digital form in the remote computer is then formatted for transmission via public switched data network, specifically Internet backbone network(s), and is routed from the remote computer system to a host network computer system. After extracting the routing information and the user data from the digital document, the document is routed via the Internet to a remote computer system near the destination facsimile.

When the document is received in the destination remote computer, software resident in the remote computer formats the received document for facsimile transmission. In one preferred embodiment of the present invention RightFAX™ handles the formatting for facsimile transmission.

The destination facsimile number is extracted from the document in digital form and sent to a modem which dials it. When the modem in the remote computer system connects to the modem in the destination facsimile machine via a local telephone line, the document is transmitted to the destination facsimile machine. If the destination facsimile number is busy or otherwise unavailable, the document in digital form is stored in the remote computer system until it is delivered or it is determined that delivery is impossible.

The system makes a number of attempts over a period of time to transmit the document to the destination facsimile. As soon as the document is delivered or after the proscribed number of attempts to deliver the document have failed, a message is generated stating the status of the facsimile delivery. That message is routed back to the originating remote computer system over the Internet. The remote computer system then transmits the delivery status message to the originating facsimile via a local telephone call.

An appreciation of other aims and objectives of the present invention and a more complete and comprehensive understanding of this invention may be achieved by studying the following description of preferred embodiment and alternative embodiments and by referring to the accompanying drawings.

DETAILED DESCRIPTION OF PREFERRED & ALTERNATIVE EMBODIMENTS

Figure 1:
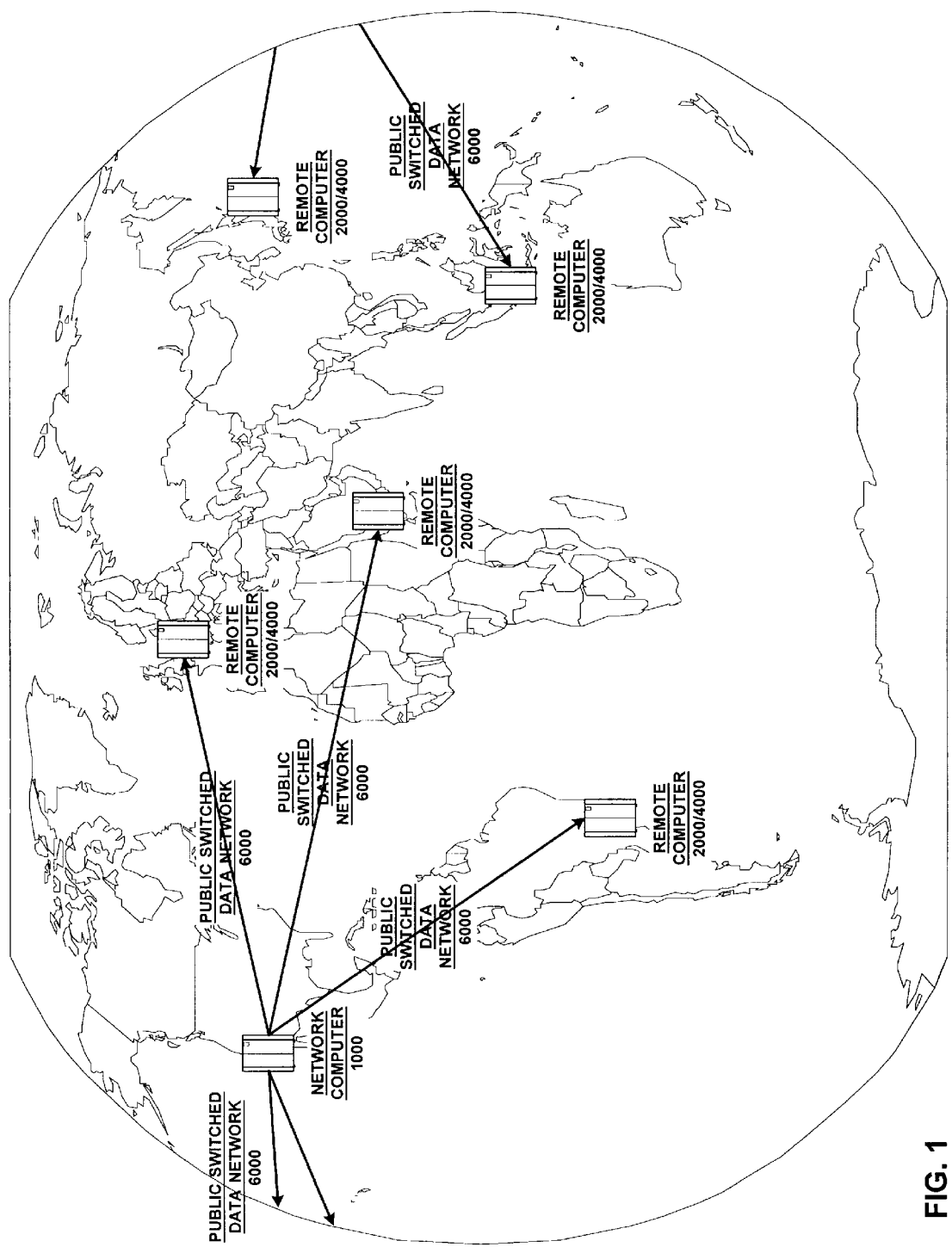
FIG. 1 is a schematic diagram representing the network comprising a number of host and remote computers interconnected via the public switched data network to enable facsimile transmissions world-wide.
Figure 2:
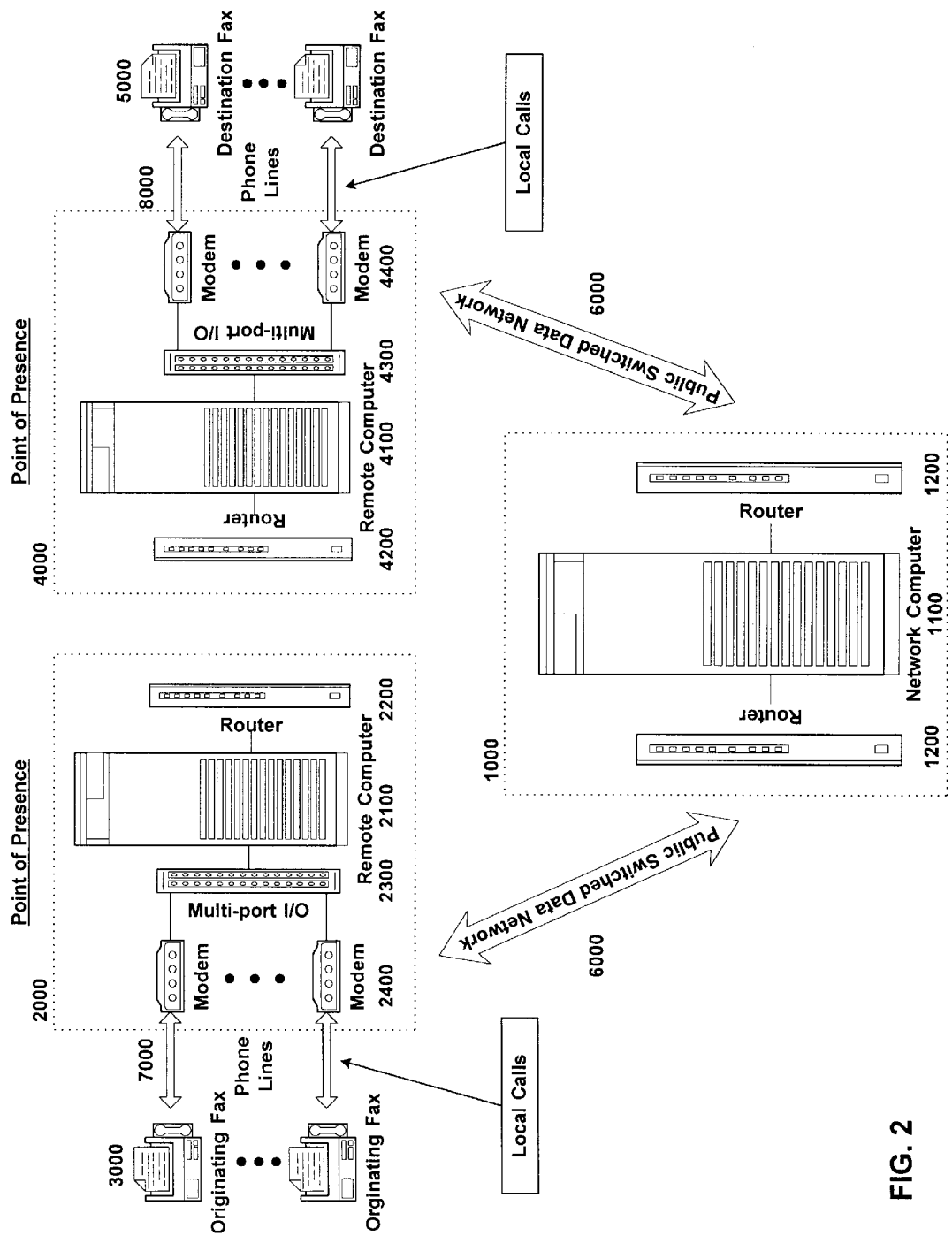
FIG. 2 is a schematic diagram of the one embodiment of the present invention, which enables traditional facsimile machines to utilize high speed packet switched data communications networks for the transmission of facsimile communications.
Figure 3:
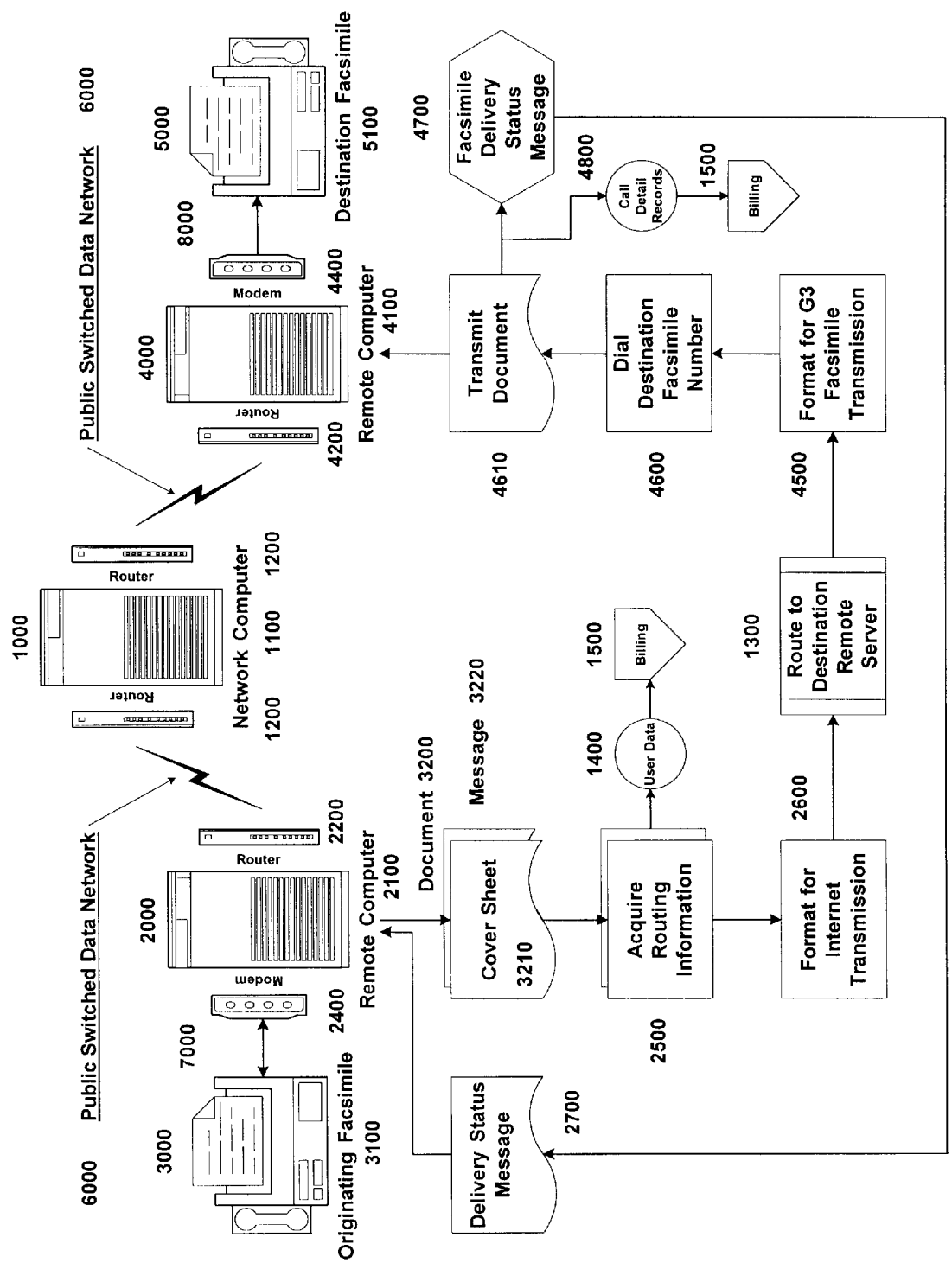
FIG. 3 is a logical function diagram of one embodiment of the present invention.
Figure 4:
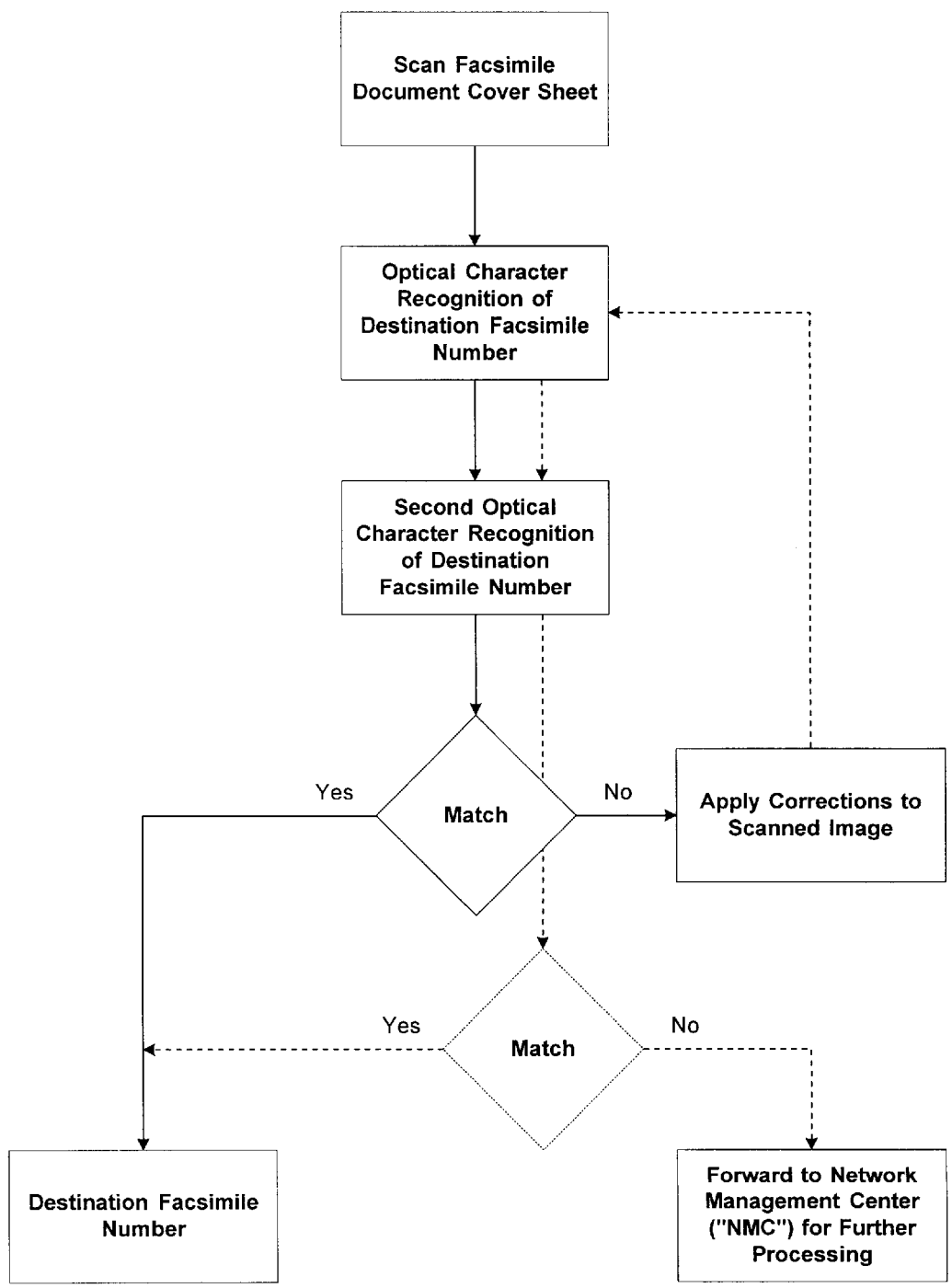
FIG. 4 is a logical function diagram which reveals the methods employed by the present invention to obtain the destination facsimile number, that is, routing information, from the facsimile document cover sheet.

As shown in FIGS. 1, 2 and 3, to send a document 3200 to a recipient, a user of the present invention first feeds a document into his or her facsimile machine 3100. The document includes (1) a cover sheet 3210 containing information about the user 1400 and the destination facsimile number 4600 and (2) a plurality of sheets comprising the message 3220 to be transmitted to the destination into the input hopper of the facsimile machine 3100. The user then dials the local telephone number of the remote computer system 2000.

When the modem in the facsimile machine 3100 connects to the modem in the remote computer system 2400 via a local telephone line 7000, the document is transmitted to the remote computer 2100. Software within the remote computer 2100 scans the cover sheet 3210. An algorithm embedded in the software identifies the location on the cover sheet where the destination facsimile telephone number is printed, either typewritten or handwritten. Optical character recognition ("OCR") software scans the area containing the destination facsimile telephone number. This number is stored at a specific location within the remote computer file which comprises the document 3200 in digital form.

A plurality of user data 1400 including, for example, the sender's name, voice telephone number, originating facsimile number, account number, number of pages comprising the document 2100, recipient name, recipient voice telephone number and the like, is likewise obtained from the cover sheet 3210. This data is appended to the remote computer file which comprises the document 3200 to be delivered to a billing program 1500.

The document 3200 in digital form in the remote computer 2100 is then formatted for transmission via public switched data network 6000, specifically Internet backbone network(s), and is routed from the remote computer system 2000 to a host network computer system 1000. This host network computer system 1000 contains user data files 1400 and a billing program 1500. After extracting the routing information and the user data from the digital document 3200, the document 3200 is routed via the Internet to a remote computer system 4000 near the destination facsimile 5000.

When the document 3200 in digital form is received in the remote computer 4100, software resident in the remote computer 4100 formats the received document 3200 for facsimile transmission 4500. The destination facsimile number is extracted from the document 3200 in digital form and sent to a modem 4400 which dials it. When the modem 4400 in the remote computer system 4000 connects to the modem in the destination facsimile machine 5100 via a local telephone line 8000, the document is transmitted to the destination facsimile machine 5100. If the destination facsimile number is busy or otherwise unavailable, the document 3200 in digital form is stored in the remote computer system 4000 until it is delivered or it is determined that delivery is impossible.

A plurality of attempts are made over a period of time to transmit the document 3200 to the destination facsimile 5000. As soon as the document 3200 is delivered or after the proscribed number of attempts to deliver the document 4610 have failed, a message is generated stating the status of the facsimile delivery 4700. That message is routed back to the originating remote computer system 2000 over the Internet. The remote computer system 2000 transmits the delivery status message 2700 to the originating facsimile 3000 via a local telephone call 7000.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the Claims that follow. The methods and apparatus that have been disclosed above are presented to educate the reader about particular embodiments, and is not intended to constrain the limits of the invention or the scope of the Claims. *The List of Reference Characters* which follows is intended to provide the reader with a convenient means of identifying elements of the invention in the Specification and Drawings. This list is not intended to delineate or narrow the scope of the Claims.

LIST OF REFERENCE CHARACTERS

1000 Network Host Computer System
1100 Network Computer
1200 Packet Switched Data Network ("PSDN") Router
1300 Software to Route Facsimile Transmission to Its Destination
1400 User Information
1500 Billing Software
2000 Remote Network Computer System
2100 Remote Network Computer
2200 PSDN Router
2300 Multi-port Input/Output
2400 Modems (Modulator/Demodulator)
2500 Software to Acquire Routing Information from Facsimile Transmission Cover Sheet
2600 Software to Convert Facsimile Format to Format for Transmission via PSDN
2700 Message Returned to Originator on Status of Delivery of Facsimile Transmission
3000 Originating User Facsimile System
3100 Facsimile Machine
3200 Facsimile Document
3210 Facsimile Transmission Cover Sheet
3220 Facsimile Transmission Message
4000 Remote Network Computer System
4100 Remote Network Computer
4200 PSDN Router
4300 Multi-port Input/Output
4400 Modems (Modulator/Demodulator)
4500 Software to Convert PSDN Transmission to Facsimile Format
4600 Software to Extract Destination Telephone Number from PSDN Transmission
4610 Transmission for Transmission of Facsimile to Destination Facsimile Machine
4700 Software to Generate Message Back to Originator on Status of Facsimile Transmission
4800 Software to Generate Call Detail Records ("CDR")
5000 Destination Facsimile System
5100 Facsimile Machine
6000 Packet Switched Data Network
7000 Telephone Line—Origination
8000 Telephone Line—Destination

What is claimed is:

1. A method of transmitting a facsimile message comprising the steps of:

feeding a document (3200) into a local facsimile machine (3100); said local facsimile machine (3100) for creating a digital image of said document (3200); said local facsimile machine (3100) having a local modem (2400);

said document (3200) including a cover sheet (3210) containing information about the user (1400) and a destination facsimile number (4600); said document (3200) also including a message (3220);

dialing a local telephone number of a remote computer system (2100) using said local facsimile machine (3100);

connecting to said remote computer system (2100) using a local telephone line (7000) connected to said local facsimile machine (3100) and said local modem (2400);

transmitting said digital image of said document (3200) to said remote computer system (2100);

using said cover sheet (3210) to identify said destination facsimile number (4600) by determining said destination facsimile number (4600) electronically and automatically using an optical character recognition software program;

formatting said document (3200) for transmission via a public switched data network (6000) using said remote computer (2100);

routing said document (3200) from said remote computer system (2100) to a host network computer system (1000);

extracting routing information and user data from said digital image of said document (3200) using said host network computer system (1000);

routing said document (3200) via said packet switched data network (6000) to a remote computer system (4000) near the destination facsimile (5000);

formatting said document (3200) for facsimile transmission; and transmitting said document (3200) from said remote computer system (4000) to its destination facsimile (5000).

2. A method as recited in claim 1, further comprising the additional step of:

routing a confirmation back to the originator to confirm delivery of said message (3220).

3. A method as recited in claim 1, further comprising the additional step of:

routing a report back to the originator to indicate that said message was not successfully delivered.

4. A method of transmitting a facsimile message comprising the steps of:

feeding a document (3200) into a local facsimile machine (3100); said local facsimile machine (3100) for creating a digital image of said document (3200); said local facsimile machine (3100) having a local modem (2400); said document (3200) including a cover sheet (3210) containing information about the user (1400) and a destination facsimile number (4600); said document (3200) also including a message (3220);

dialing a local telephone number of a remote computer system (2100) using said local facsimile machine (3100);

connecting to said remote computer system (2100) using a local telephone line (7000) connected to said local facsimile machine (3100) and said local modem (2400);

transmitting said digital image of said document (3200) to said remote computer system (2100);

using said cover sheet (3210) to identify said destination facsimile number (4600) by determining said destination facsimile number (4600) electronically and automatically using an optical character recognition software program;

routing said document (3200) from said remote computer system (2100) via said packet switched data network (6000) to a remote computer system (4000) near the destination facsimile (5000); and transmitting said document (3200) from said remote computer system (4000) to its destination facsimile (5000).

5. A method as recited in claim 4, further comprising the additional step of:

routing a confirmation back to the originator to confirm delivery of said message (3220).

6. A method as recited in claim 4, further comprising the additional step of:

routing a report back to the originator to indicate that said message was not successfully delivered.

\* \* \* \* \*